United States Patent [19]

Arreola, Jr.

[11] Patent Number: 4,926,061
[45] Date of Patent: May 15, 1990

[54] WINDTRAP ENERGY SYSTEM

[75] Inventor: Jose L. Arreola, Jr., Galveston, Tex.

[73] Assignee: ECM International Inc., Tacoma, Wash.

[21] Appl. No.: 229,229

[22] Filed: Aug. 8, 1988

[51] Int. Cl.$^5$ .............................................. F03D 9/00
[52] U.S. Cl. .................................................... 290/55
[58] Field of Search ...................... 290/55, 44, 54, 43; 307/66; 416/197 A, 117

[56] References Cited

U.S. PATENT DOCUMENTS

| | | | |
|---|---|---|---|
| 2,431,111 | 11/1947 | Dubrie | 290/55 |
| 4,031,405 | 6/1977 | Asperger | 290/55 |
| 4,134,707 | 1/1979 | Ewers | 290/55 X |
| 4,134,710 | 1/1979 | Atherton | 290/53 X |
| 4,220,870 | 9/1980 | Kelly | 290/55 X |
| 4,278,894 | 7/1981 | Ciman | 290/55 X |
| 4,382,191 | 5/1983 | Potter | 290/55 |
| 4,649,284 | 3/1987 | Hsech-Pen | 290/55 |

Primary Examiner—William M. Shoop, Jr.
Assistant Examiner—Sharon D. Logan

[57] ABSTRACT

A windmill of two designs, both aesthetically acceptable and operational without noise pollution, having a rotatable vertical shaft with either three or four windtraps consisting of a pair of concave vanes. These vanes are attached by welding to both the base and top disk plate making up a windtrap unit. Each windtrap vane is positioned to the others at 60 degree displacement for the first design and 45 degrees on the second design.

The horizontal exposure area to the wind fluctuates from 50% to 100% as the shaft makes a complete turn. Torque is applied to the shaft by the impact of the wind from any direction against the curved vanes. The kenetic energy of the wind is transmitted through the shaft, flywheel, and belts which turn multiple generators that are used to produce electricity. The electricity is further processed by a micro controller to make it usable for home, farm, and business use. It further utilizes battery packs for storing electricity.

The system can be lowered to a horizontal position in the event of a severe storm.

The invention also contemplates using superconductivity for maximum generation of electricity and magnetic shielding.

5 Claims, 8 Drawing Sheets

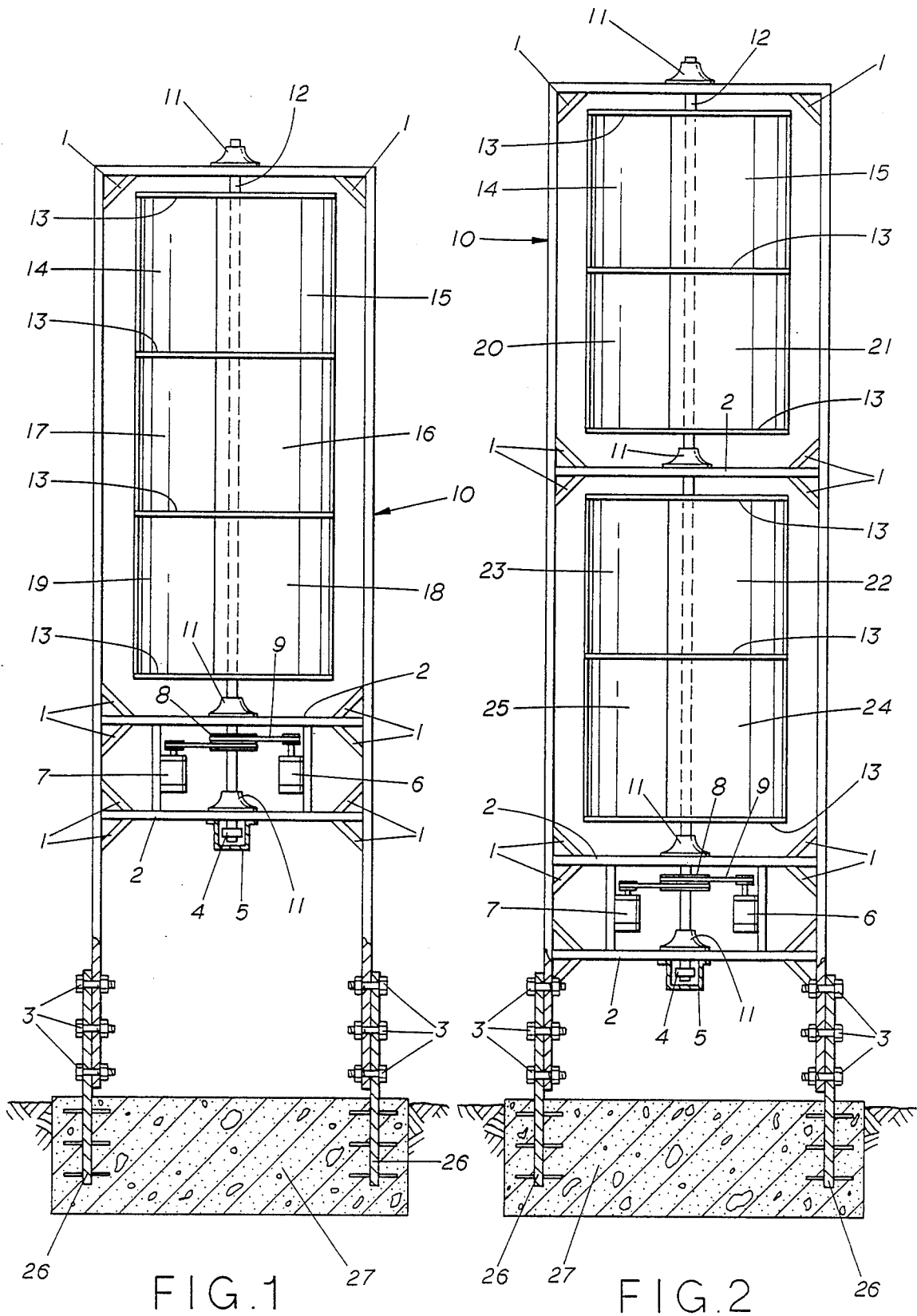

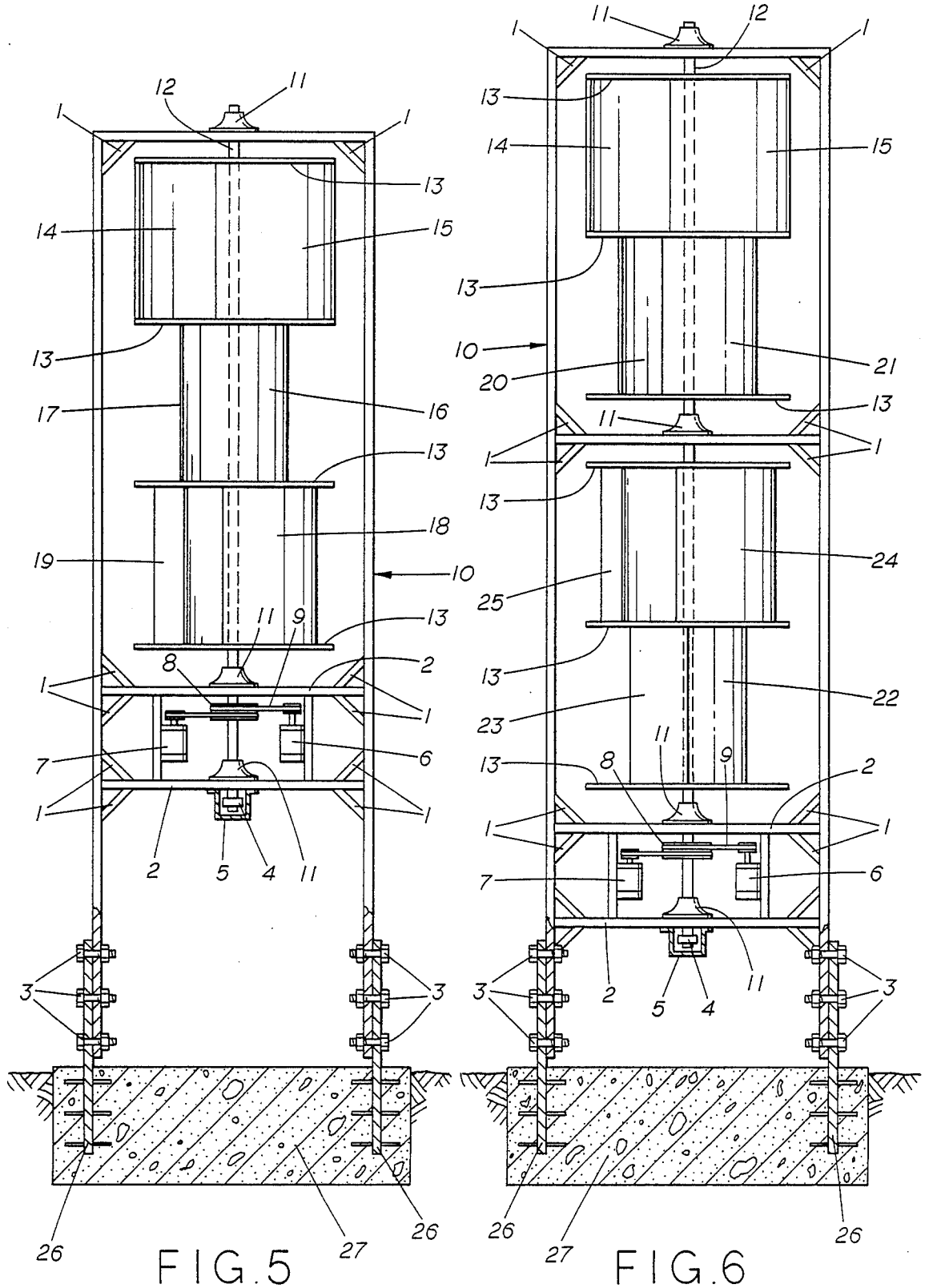

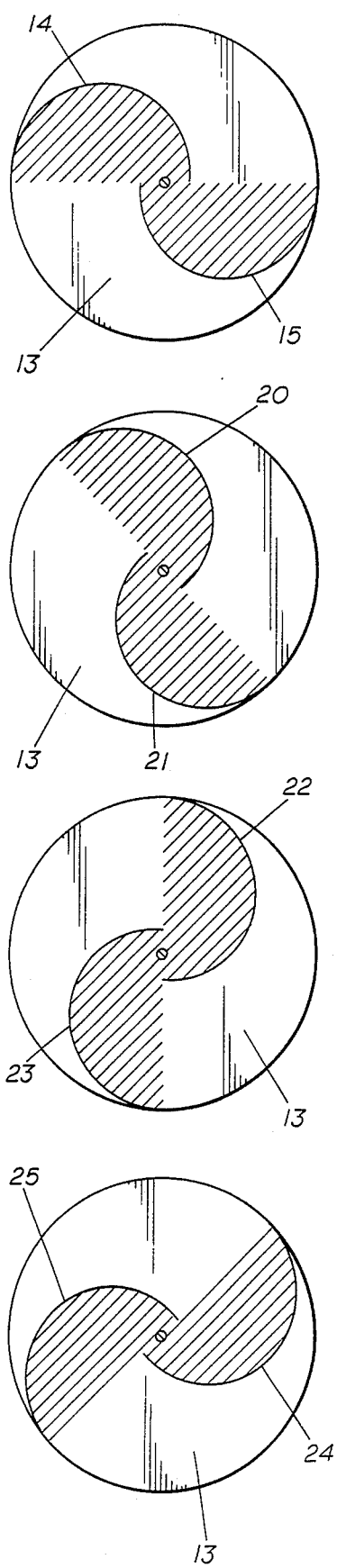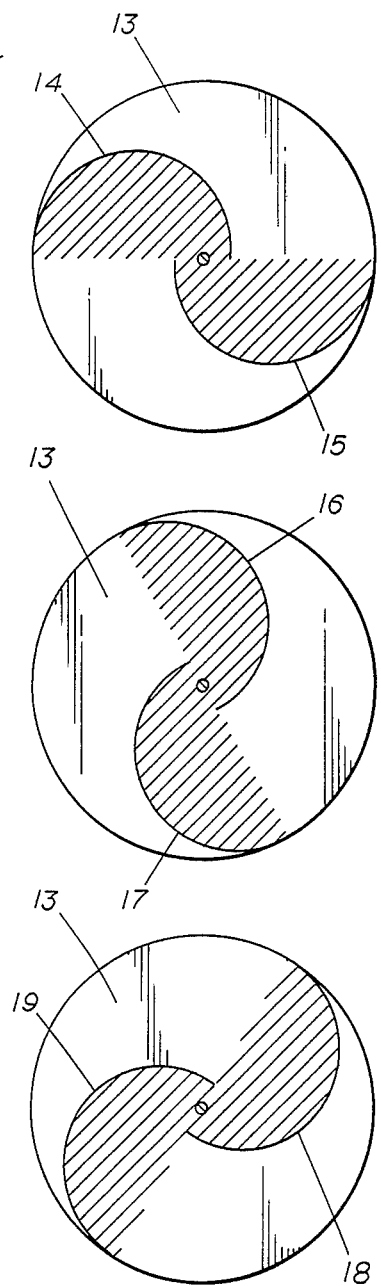
FIG. 7
FIG. 8

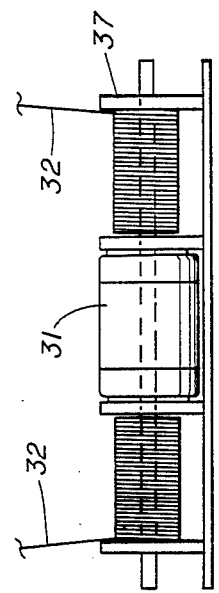
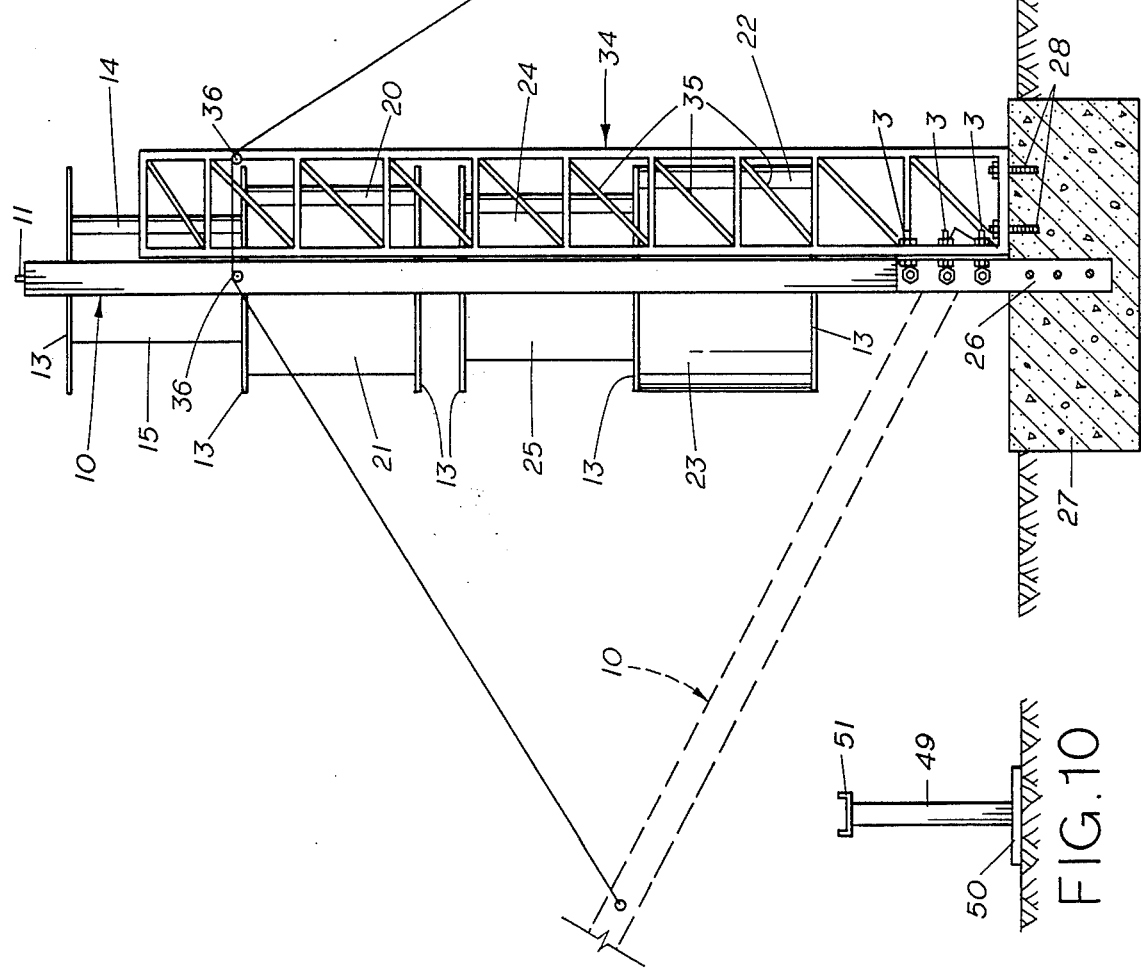

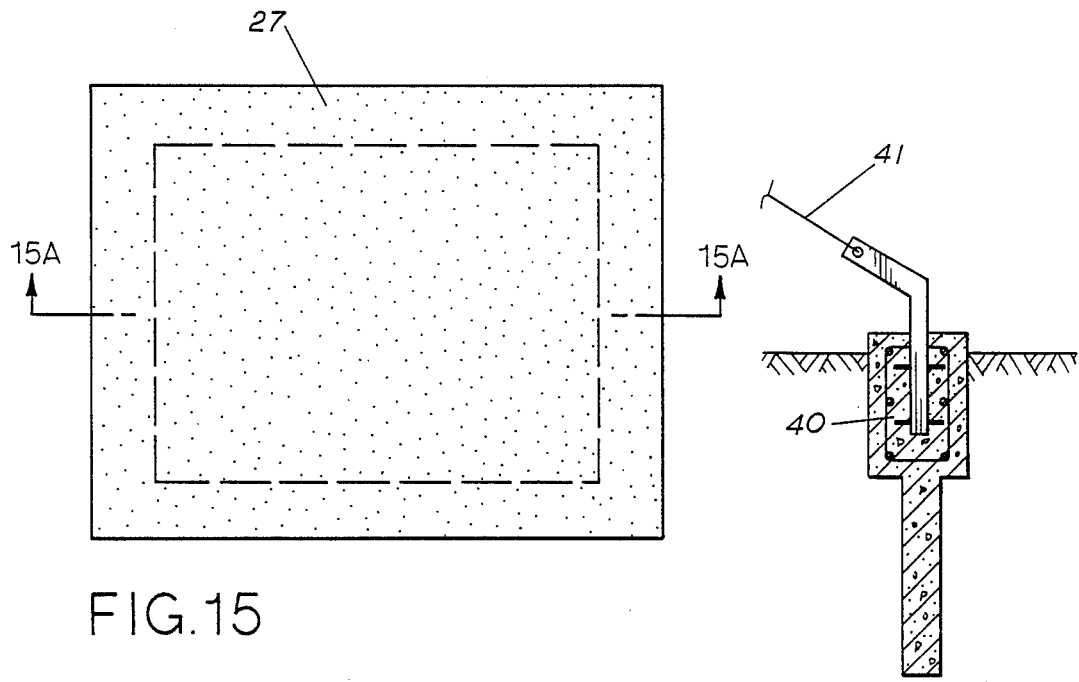
FIG.15
FIG.17
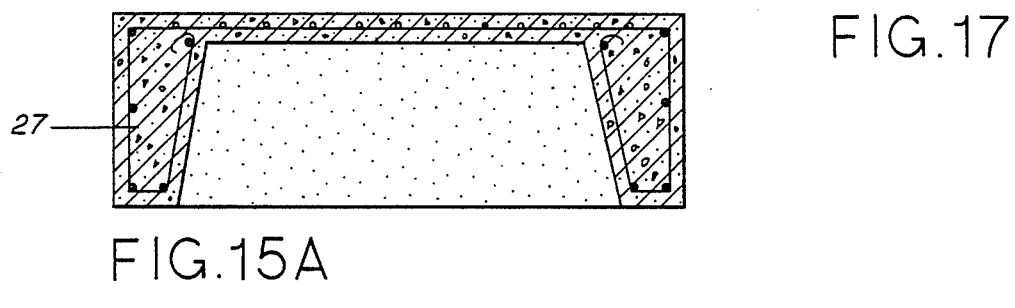
FIG.15A
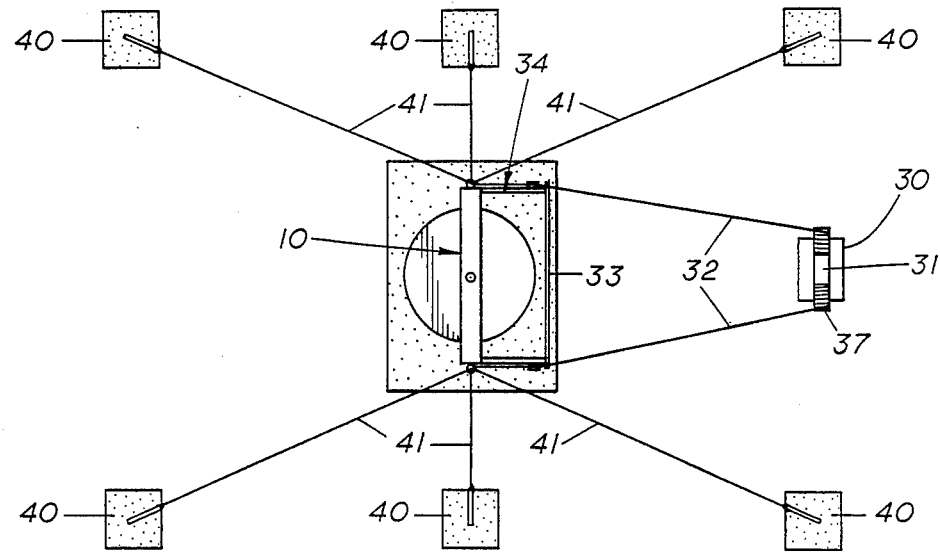
FIG.16

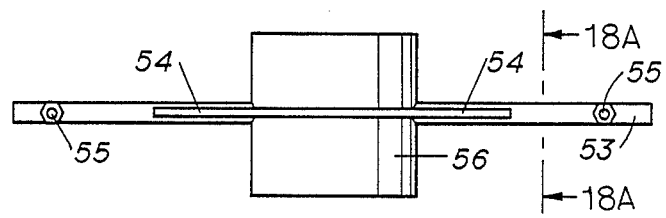
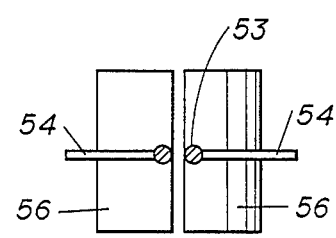
FIG.18  FIG.18A
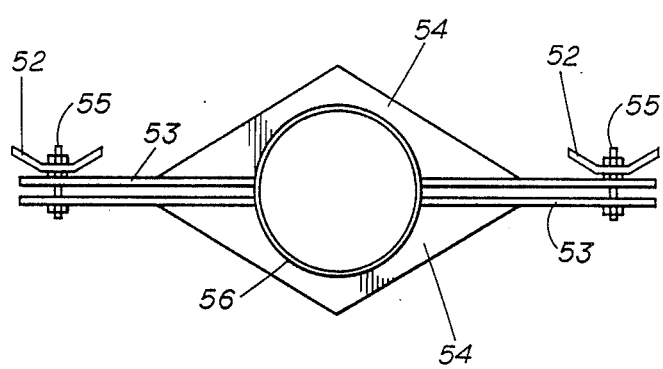
FIG.18B
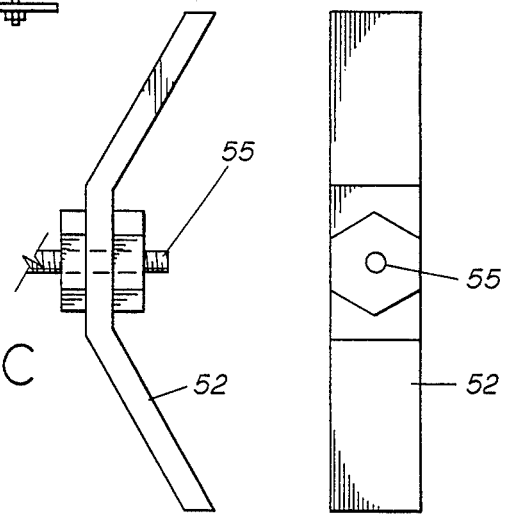
FIG.18C
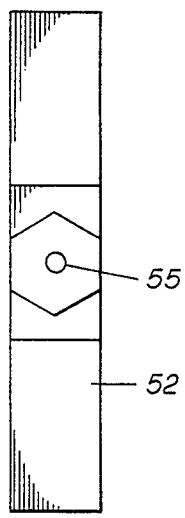
FIG.18D
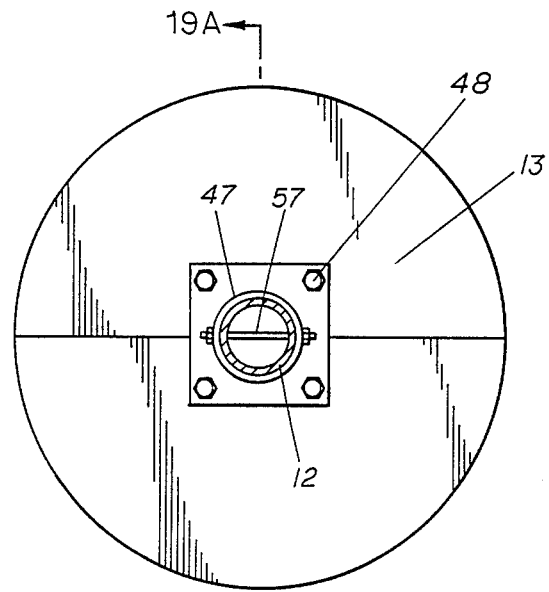
FIG.19
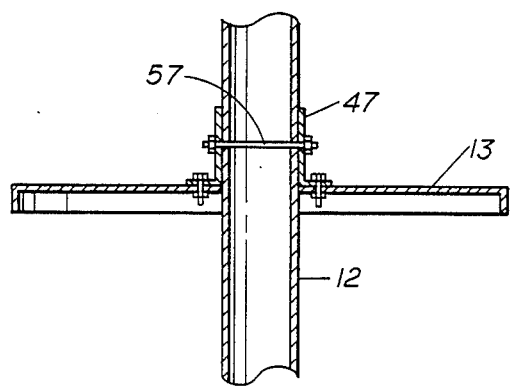
FIG.19A

WINDTRAP ENERGY SYSTEM

BACKGROUND OF THE INVENTION

In recent years there has been a resurgence of interest in wind power due to rising energy costs. Wind capturing devices have been used for centuries in the form of sails and windmills. This captured force of wind was most often used to move an object through water or lift water from a well What was established here is the proposition that a geometrically designed body can harness the natural power of the wind.

With the invention of the electrical generator it became obvious that the wind turbine could produce electricity. This electricity could be utilized in more practical uses for both home and business needs. With the invention of the generator came additional research and development in windmill design for electrical generation. The windmill now could be used to rotate the shaft of an electro-magnetic generator to produce electricity.

Although rising costs of electricity have spurred interest in windmill research and development in the past 15 years, other technical breakthroughs have motivated this invention in the area of micro computing, battery technology and superconductivity. What was established in these inventions was the development of highly effecient generators and electrical storage devices.

Examples of a prior art with a configuration similar in part to the invention being presented are: U.S. Pat. Nos. 4,650,403; 4,047,834; 2,007,963; 3,942,909; 1,766,765; 1,646,673; 1,367,766; 1,697,574 Dutch Pat. No. 821,930 Australian Pat. No. 117,423

There are a series of patents of windmills that teach a design utilizing a "Savonious rotor". One of these patents of Wilson, 1927 No. 1,646,673, which precedes the Savonious patents of Nos. 1,766,765 and 1,697,575. These three patents teach a windmill design utilizing a cut in half displaced cylinder for a rotor. A German Pat. No. 821,930 utilizes a similar "Savonious" rotor in a two stacked arrangement. An Australian Pat. No. 117,423 teaches a single "Savonious rotor" coupled with a ventillator design.

Pat. No. 4,650,403 teaches an art of attaching "wind collectors" to a shaft. Pat. No. 4,047,834 teaches an art of wind buckets stacked to harness the wind energy.

SUMMARY OF THE INVENTION

The invention provides for a windmill energy system which utilizes teachings of prior arts but configures the physical structure and electronic design in a highly efficient and cost effective manner with both esthetic and noise pollution considerations.

The design of the system provides for energy generation at low wind velocities as well as a counter air flow and a varience of exposure in high winds.

Sheet aluminum of standard size is utilized for cost effectivness and minimized weight for maximum power generation. The design teaches a structurally sound construction with a winch mechanism for the raising and lowering of the system in the event of winds in excess of 75 miles per hour.

The system mechanical structure is not designed with any mechanism to control speeds except for a braking device. The system produces a constant voltage and 60 hertz current flow by utilizing a micro controller.

The electrical components of the primary design utilize a combination of an AC and DC generator both of which are inclosed in a housing. The DC generator of a smaller size is used to induce a force field into the electro-magnets of the AC generator which in turn produces an AC current. The DC generator also provides for electricity for a mini cooling system for the AC generator if superconductivity materials are used in both the generator and the magnetic shielding of the housing.

Multiple AC/DC Generator combination can be supported by this system with electricity distributed to more than one prescriber.

The AC current generated from the primary electrical source then is transferred to a micro controller.

The micro controller supports the following functions:

Produces 60 hertz alternating current at proper voltage.

Charges batteries with direct DC current.

Utilizes battery backup if voltage generated by windmill is below acceptable limits Utilizes utility electrical power if both battery and windmill voltage is low.

Transfer power to the utility company if overload and battery is fully charged. The word battery may imply a set of batteries.

If excessive voltage can be achieved then transformers will be used to downgrade voltage for each prescriber.

BRIEF DESCRIPTION OF THE DRAWINGS

FIG. 1 is a side view of the first preferred embodiment of the windtrap energy system.

FIG. 2 is a side view of the second preferred embodiment of the windtrap energy system.

FIG. 5 shows a side view of the windtrap phases of the first preferred embodiment.

FIG. 6 shows a side view of the windtrap phases of the second preferred embodiment.

FIG. 7 shows a view of the windtrap pair of vanes of the second preferred design and their relative position to each other.

FIG. 8 shows a view of the windtrap pair of vanes of the the first preferred design and their relative position to each other.

FIG. 9 shows the winch pully control unit.

FIG. 10 shows the horizontal holding stand for the windmill.

FIG. 11 shows the side view of the winch structure.

FIG. 15 and FIG. 15A shows the foundation for the windmill structure.

FIG. 16 shows the windmill base elements including the support cables which may not be necessary due to the winch structure and system inertia.

FIG. 17 shows the foundation for the support cables.

FIGS. 18–18D shows the braking mechanism for the windtrap energy system.

FIG. 19 and FIG. 19A shows the windtrap disk plate connection to the shaft.

DESCRIPTION OF THE PREFERRED EMBODIMENT

Figure 3:
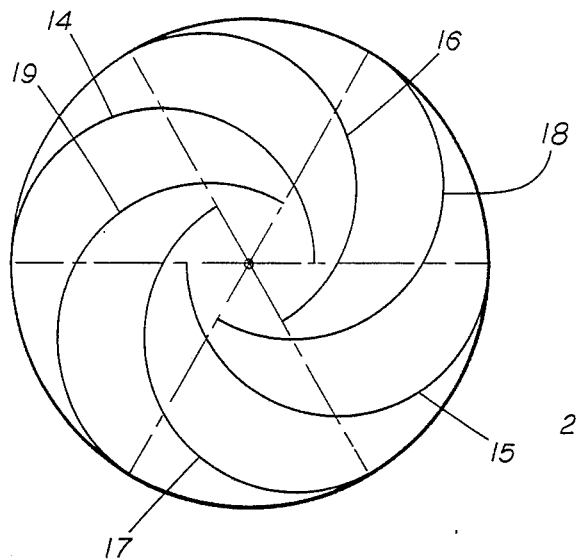
FIG. 3 shows the relative position of the vanes wind impact surfaces to each other in three pair sets for the first preferred embodiment.

This invention can be more readily understood by reference to the drawing in which:

FIG. 1 illustrates a first preferred embodiment of a wind driven assembly as presented in this invention. The assembly shows the windtrap elements in a solid structure with a shaft that connects to two or more electrical generators. See FIG. 20. Through this assembly, the kenetic energy of the wind is converted into electrical energy. The electrical energy is in the form of fluctuating AC current and voltage which is directly proportional to the speed of the wind. Subsequent drawings describe the electrical controller that generates usable electricity.

FIG. 2 illustrates the second preferred embodiment similar in all elements as to the description of the first preferred embodiment except for the four windtraps and the modification to the structure in support of the additional windtrap.

Each of the windtraps has a set of vanes attached to disk plates on both the top and bottom. The disk plates have an opening for the shaft and an attachment to the shaft which is not shown.

In FIG. 1 two vanes 14 & 15 along with their respective disk plates 13 make up a windtrap. Also in FIG. 1 vanes 16 & 17 along with their respective disk plates 13 make up the second windtrap. Vanes 18 & 19 along with their respective disk plates 13 make up the third windtrap.

In FIG. 2 vanes 14 & 15 along with the respective disk plates 13 make up the first windtrap. Vanes 20 & 21 along with the respective disk plates 13 make up the second windtrap. Vanes 22 & 23 along with the respective disk plates 13 make up the third windtrap. Vanes 24 & 25 with the respective disk plates 13 make up the fourth windtrap.

FIG. 1 and FIG. 2 shows an invention with a preferred embodiment where the structural frame 10 is supported by braces 1 and attached to the ground foundation by supporting stabilizing bolts 3 which connect the structural frame 10 to structural support beams 26 which are implanted in reinforced concrete foundation 27.

The windtrap energy system built according to the invention in FIG. 1 and FIG. 2 has the shaft attached to the frame using a bearing housings 11. The shaft is supported by a series of bearing housing 11 which may be either three or four depending on the design.

At the bottom of the shaft are two flywheels 8 and a braking device 4 which is encased in a brake housing 5.

Figure 20:
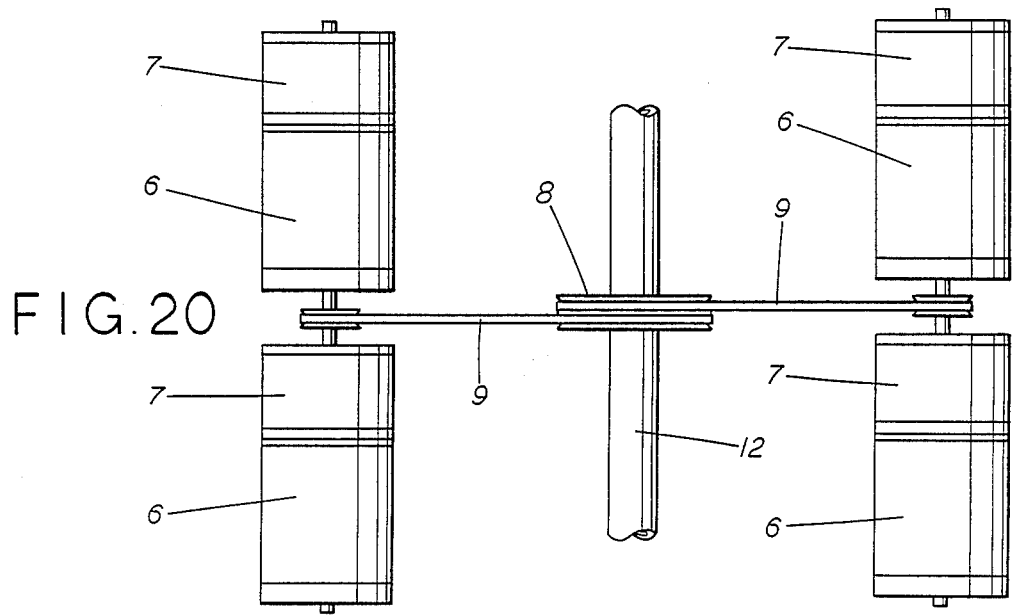
FIG. 20 shows a multiple generator assembly supported by a flywheel and belts.

The flywheel 8 utilizes belts 9 to rotate electrical generating devices 6 and 7. The generating devices are a ombination of DC induction generator and an AC primary generator. Although the design shows two seperate units, FIG. 20 shows a variation contemplated.

FIG. 3 is a bird's eye view of the first preferred embodiment windtrap vane surfaces positioning relative to each other which provides for a highly balanced and efficient configuration.

Each vane is 60 degrees apart from the other and the combination of vanes provides for intercept of wind kenetic energy from any direction. The wind kenetic energy is transferred to the windtrap device at point of initial impact and at secondary impact resulting from the flowthrough effect. The force of the wind against these vanes of the windtrap device results in rotation of the shaft with a significant torque to support highly efficient kilowatt generators in producing electrical energy. The vanes involved in FIG. 3 are 14, 15, 16, 17, 18 and 19.

Figure 4:
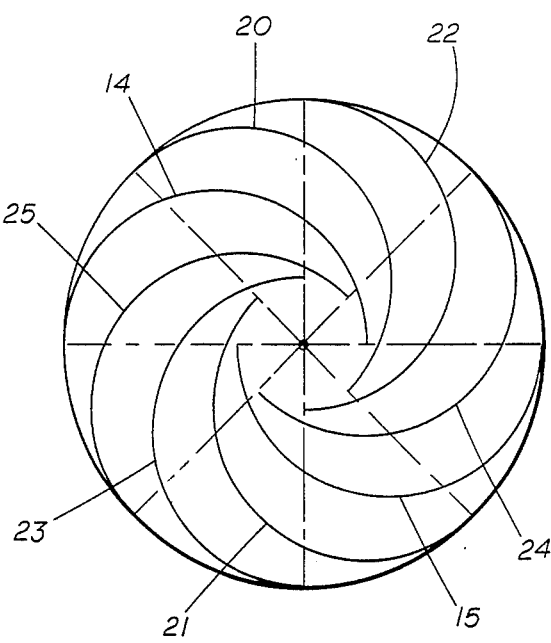
FIG. 4 shows the relative position of the vanes wind impact surfaces to each other in four pair sets for the second preferred embodiment.

FIG. 4 is a bird's eye view of the first preferred embodiment windtrap vane surface positioning relative to each other. Each vane is 45 degrees apart from the other and the combination of vanes provides for intercept of wind kenetic energy from any direction. The wind kenetic energy is transferred to the windtrap device at point of initial impact and at secondary impact resulting from the flowthrough effect. The force of the wind against these vanes of the windtrap device results in rotation of the shaft with a significant torque to support highly efficient kilowatt generators in producing electrical energy. The vanes involved in FIG. 4 are (14,15), (20,21), (22,23), and (24,25).

PAGE 2 OF DETAIL DESIGN

FIG. 5 of the first preferred embodiment is similar to FIG. 1 except that it shows a side view of the phases of exposure by the windtraps to wind gusts. This unique exposure process provides for minimal impact of high wind bursts reducing the possibility of wind damage. The rotational mass of the system develops inertia which also provides for system stability.

FIG. 6 is the second preferred embodiment and is similar to FIG. 2 except that it also shows a side view of the phases of exposure by the wind traps to wind gusts. The rotational mass of the system develops inertia which also provides for system stability.

FIG. 7 shows the four windtraps utilized in the second preferred embodiment of the invention. The hashed area show the curvitures more clearly and represent the wind impact area. It also shows more clearly the pair of vanes that make up each windtrap. FIG. 7 is similar as to elements of FIG. 4.

FIG. 8 shows the three windtraps utilized in the first preferred embodiment of the invention. The hashed area show the curvitures more clearly and represent the wind impact area. It also shows more clearly the pair of vanes that make up each windtrap. FIG. 8 is similar as to elements of FIG. 3.

PAGE 3 DETAIL DESIGN

FIG. 9 shows the winch pully mechanism. The winch is operated by either a pully motor 31 or manually by two pully shafts with an attachable handle located at the extreme corner of the pully foundation 37 so as to permit adequate space for the handles to be operative. The winch motor 31 either raises or lowers the windtrap structure by releasing or collecting the winch cable 32 on its shaft 37 after the two of the stabilizing bolts 3 are removed.

FIG. 10 shows the horizontal windmill support. In the event of severe winds, the windtrap energy system can be lowered to a horizontal position where the top of the shaft would rest on the U support 51. A horizontal support pipe 49 provides for adequate spacing so that the windtraps are kept off the ground. Two of these supports are required, one on each side of the windtrap assembly.

Figure 12:
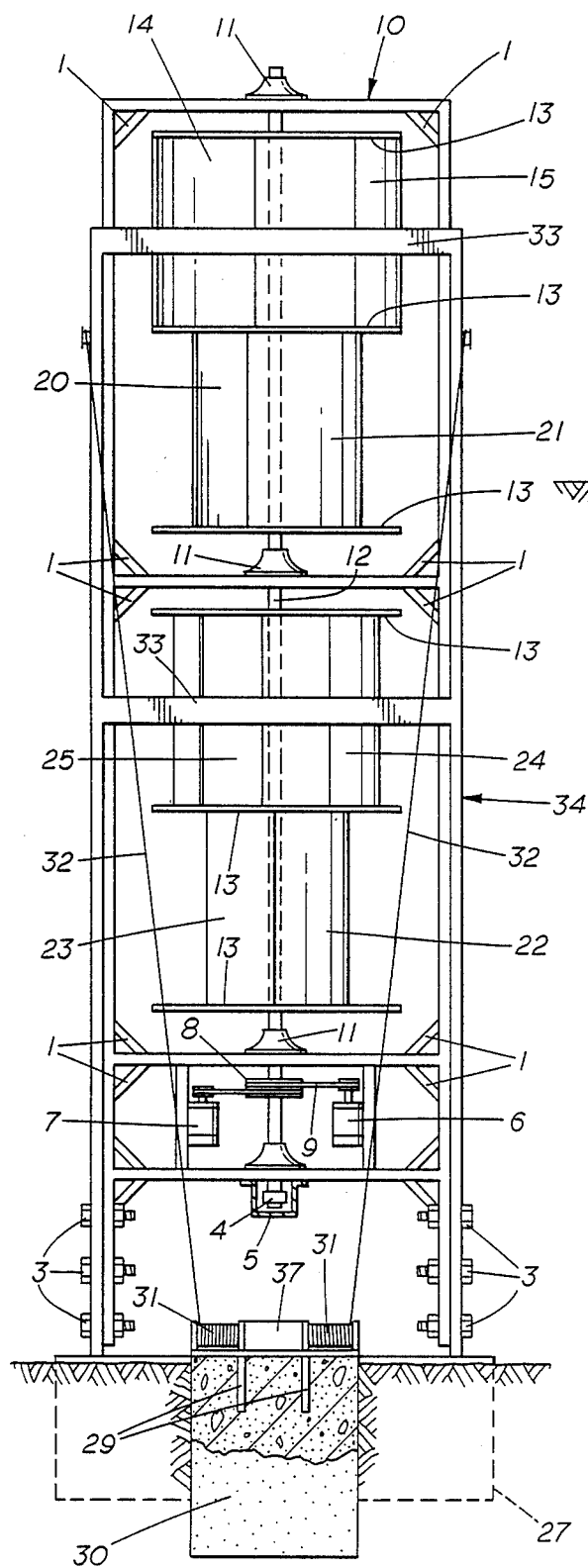
FIG. 12 shows a front view of the winch structure.

FIG. 11. and FIG. 12 shows the windtrap energy system with a winch structure which provides for its raising and lowering in the event of severe storms. FIG. 11 is a side view while FIG. 12 is a front view of the winch support structure.

A pully 11 which may be mechanical or an electrical motor 31 controls the raising and lowering process utilizing cables 32 which glide over pully shaft 36 that are attached to the winch structural frame 34. The winch structural frame has truss supports 35 and foundation taps for the truss base. All other items numbered in diagram have been described in FIGS. 1 & 2.

PAGE 4 OF DETAIL DESIGN

Figure 13:
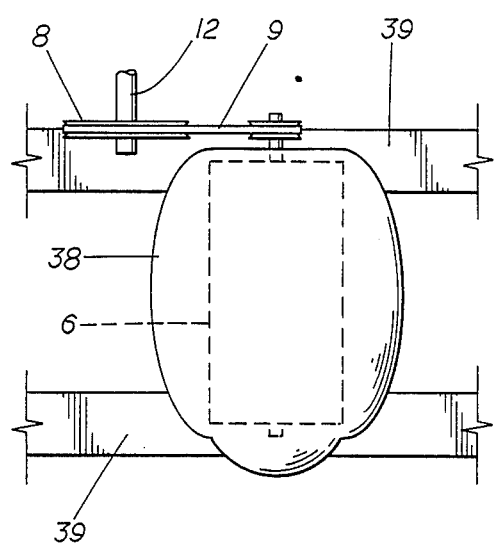
FIG. 13 shows the flywheel, generator, belts, and housing.

FIG. 13 shows the encasement 38 of the generators which is attached to the cross members 39 of the windtrap energy system. The connection of the encasement is not shown nor is the mini cooling system for superconductivity coating and generator if the superconductivity feature is applied.

Figure 14:
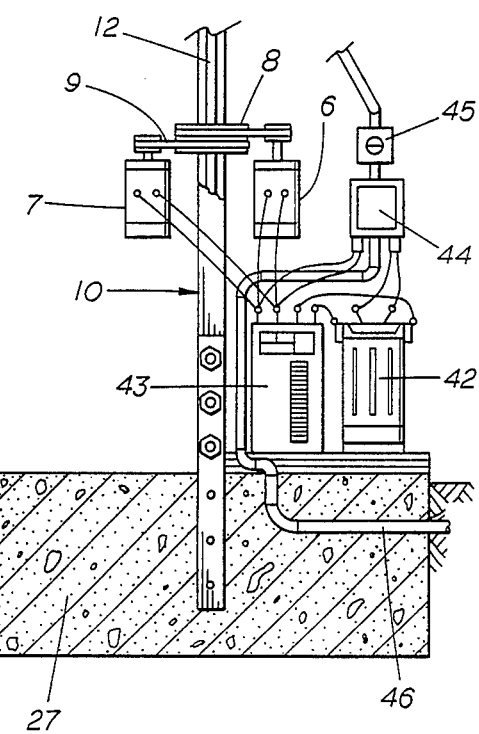
FIG. 14 shows the electrical components of the windtrap energy system

FIG. 14 shows the electrical components not necessarily in actual positioning but rather as an inclusion of the electrical elements. There are two electrical generating devices 6 & 7 which are connected to a controller 43 which has within its housing battery packs. Electrical flow from the power and light company is routed through the electric meter 45 and into the breaker box 44 with a direct route to the controller 43.

The controller 43 utilizes first the power from the generators 6 & 7, then the battery power, and as a last resort the power from the light company.

If higher then required voltage can be maintained by the generators then a transformer will be used to bring the voltage down to usable rating for possibly multiple users. This electrical diagram is a simple description of the electrical components of the windtrap energy system and is not to be construed as the exact wiring requirements nor is it intended to limit this invention to a single service and/or provide the ability of selling energy to the power company. The other generator or generators could be attached to another controller(s).

The controller input terminals have attached to them three different input electrical sources. This should not be construed as the actual circuitry but rather a simple representation of input to the controller.

The single meter to measure electricity utilized from the power company should be construed as the only possible meter for the windtrap energy system since this system has the capability of providing the power company with electrical energy.

The seperate transformer should also not limit this invention since a transformer could be an integral part of a controller.

FIG. 15 shows the top view of the foundation for the windtrap energy system. FIG. 15A shows a side view of the foundation. The foundation 27 is made of reinforced concrete.

FIG. 16 shows a top view of the structural supports for the windtrap energy system. There are six support cables 41 that are attached to the windtrap structural frame 10 and to the cable foundation 40. There are two winch cables 31 that are attached to the manual or electric pulley control 37 and the winch structure pulley rollers 36 and the windtrap structural frame 10.

FIG. 17 shows a side view of the cable foundation 40 and the cable 41 extending from the foundation to the windtrap structure.

PAGE 5 & 6 OF DETAIL DESIGN

FIGS. 18–18D shows the manual braking device used for stoping the rotational motion of the windmill prior to taking the system from a vertical position to a horizontal position. The braking device consists of braking bars that are attached to the windmill structure. Strength is provided to the braking device by a set of brake plates 54. Pressure is applied by the brake handle 52 to a nut on a brake bolt 55 which forces the brake cylinder to create friction with the brake show causing the windmill to stop.

FIG. 19 and FIG. 19A shows the method for attaching the base of the windtrap units to the shaft. The windtrap disk 13 is attached to the shaft 12 by a metal plate and cylinder 47 welded together. The cylinder 47 is attached to the shaft by one or two galvanized bolts 57. The metal plate 47 is also attached to the windtrap disk 13 by a set of four galvanized bolts 48.

FIG. 20 shows the ultimate configuration of generators in combinations supported by one double flywheel and two belts. Under this design, the DC induction generator 7 is housed together with the AC generator 6 on the same shaft. Up to four of these units can be supported by the windtrap energy system. The flexibility of the system provides for the support of one DC induction generator on one side and an AC generator on the other side of the windtrap shaft as shown in FIGS. 1, 2, 5, and 6, to the configuration displayed in FIG. 20.

In all cases, the shaft 12 moves the pulleys 8 which utilize the belts 9 to drive the generator pully at a speed advantage ratio.

What is claimed is:

1. A windtrap energy system which converts kinetic energy of the wind to the electrical energy usable for home, farm, or business comprised of:
    a structural frame that is supported by a base foundation and winch support system;
    a rotary shaft that is attached to the frame via a bearing housing;
    a series of three windtraps connected to the rotary shaft;
    each windtrap consisting of two half disks that are attached to the rotary shaft and a pair of concave vanes attached to the disks in opposite directions and having partial overlap at the center of the disk;
    each of the concave vanes are 60 degrees apart from each other on a horizontal plane thereby providing kinetic energy capture from wind in any direction and the windtrap energy system is capable of sustaining winds up to 75 miles per hour and also the windtrap energy system is capable of producing electricity at wind speeds less that 10 miles per hour;
    a flywheel attached to the rotary shaft and carrying two belts that are attached to pairs multiple generator devices in pairs with one of the pair being a DC induction generator and the other an AC generator;
    an electrical controller that analyzes electrical flow and develops a set required voltage and current at 60 hertz, said electrical controller utilizes as a primary source the windtrap energy system and as a secondary source battery packs which during low energy consumption are recharged by the windtrap energy system;
    the winch support system is connected to the frame and can lower the windtrap energy system to a safe horizontal position in the event of severe wind conditions after a breaking device has been set.

2. The windtrap energy system of claim 1 wherein four windtraps are connected to the rotary shaft each of the concave vane surfaces are 45 degrees apart from each other on a horizontal plane thereby providing kinetic energy capture from wind in any direction.

3. The windtrap energy system of claim 1 wherein cables are connected to the structural frame for providing additional support cables capable of sustaining gusts of wind up to 75 miles per hour due to the unique windtrap vane exposure from one windtrap to another in either of three or four windtrap units which shows to the wind a fluctuating surface exposure based on a vertical plane as well as the inertial buildup of the rotating windtraps during high wind velocities.

4. The windtrap energy system of claim 1 wherein superconductivity materials are utilized in the generator rotor and encasement.

5. The windtrap energy system of claim 1 the vanes have large surface area, geometrical concave vane design, and simplified interface to the generators for eliminating noise pollution commonly associated with windmills.

* * * * *